E. M. MAY.
Molds for Ice-Cream, Jellies, &c.

No. 141,882. Patented August 19, 1873.

WITNESSES.
E. A. Bates.
Chas. P. Steele

INVENTOR.
E. M. May,
Chipman Hosmer & Co,
Attys.

UNITED STATES PATENT OFFICE.

EDGAR M. MAY, OF FOND DU LAC, WISCONSIN.

IMPROVEMENT IN MOLDS FOR ICE-CREAM, JELLIES, &c.

Specification forming part of Letters Patent No. 141,882, dated August 19, 1873; application filed February 8, 1873.

*To all whom it may concern:*

Be it known that I, E. M. MAY, of Fond du Lac, in the county of Fond du Lac and State of Wisconsin, have invented a new and valuable Improvement in Molds for Ices; and I do hereby declare that the following is a full, clear, and exact description of the construction and operation of the same, reference being had to the annexed drawings making a part of this specification, and to the letters and figures of reference marked thereon.

Figure 1:
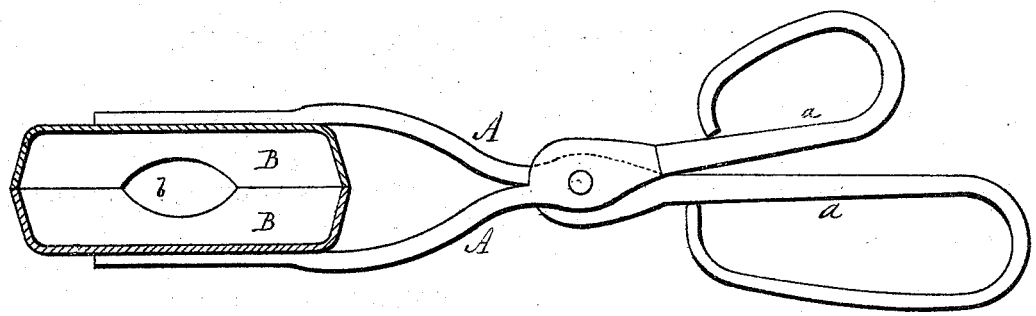
Figure 2:
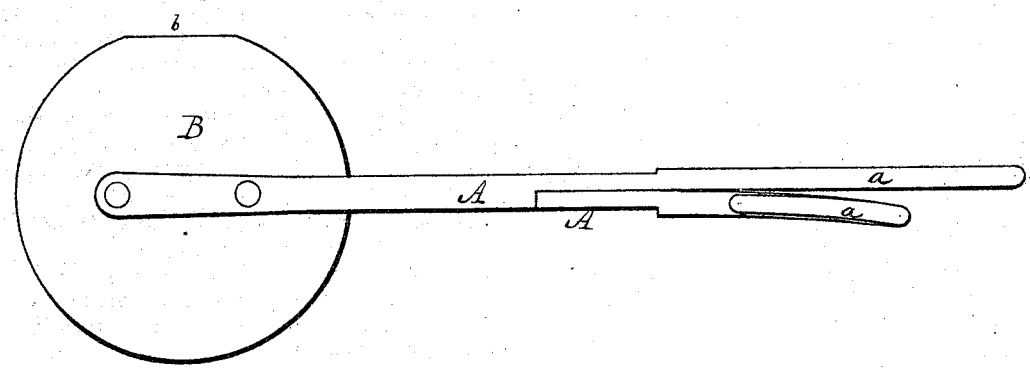

Figure 1 of the drawings is a representation of a sectional view of my mold for ices. Fig. 2 is a top view of the same.

My invention relates to a device for molding ice-cream, water-ices, jellies, &c.; and it consists in a pair of cups or pans attached to two bars or levers, which are pivoted together and provided with thumb and finger loops like a pair of shears, so that the device may be readily operated by hand.

In the drawing, A A represent two bars or levers, pivoted together like a pair of shears, and having at their rear ends thumb and finger loops $a$ $a$. To their front ends are riveted, soldered, or otherwise secured, pans or cups B B with their open portions facing each other. Each cup has a curved piece cut from one side, so that when they are closed together they resemble a round box with an opening, $b$, in the periphery.

In using this mold, it is held by the thumb and fingers like a pair of shears. The pans are opened and dipped in the cream, or other substance to be molded, taking up as much as can be held between them. They are then forced together, pressing the cream into a compact mass between them, the surplus passing out through the opening $b$, forming the cream into a cake, which may be turned out of the mold into a dish.

The cups may be made of cast or sheet metal, or any other suitable material, with their inner surfaces corrugated, carved, or ornamented in any desired manner.

What I claim as new, and desire to secure by Letters Patent, is—

In a mold for ices, &c., the cups B B attached to the pivoted bars A A, and provided with the filling-openings $b$, substantially as shown and described.

In testimony that I claim the above I have hereunto subscribed my name in the presence of two witnesses.

EDGAR MASON MAY.

Witnesses:
AUGUST CARSTENS,
T. S. HENRY.